Patented Mar. 15, 1932

1,849,778

UNITED STATES PATENT OFFICE

FRANK WILCOXON, OF YONKERS, NEW YORK, ASSIGNOR TO WALTER C. O'KANE AND PAUL MOORE, AS TRUSTEES OF CROP PROTECTION INSTITUTE, OF WASHINGTON, DISTRICT OF COLUMBIA, AN ASSOCIATION

FUNGICIDE

No Drawing.  Application filed October 20, 1926. Serial No. 143,021.

This invention relates to fungicides and disinfectants, and more particularly to compositions for disinfecting seeds before planting.

In the prior art, attempts have been made to treat seeds prior to planting in order to disinfect the seeds against fungous parasites. But such attempts have not been successful, primarily because the materials which were utilized for this purpose were either injurious to the subsequent germination of the seed, or on the other hand were incompletely effective. In order that such a preparation should be of value, it is necessary that the active agent should be in a form which will not injure the seed, but will prevent germination of the spores of fungous parasites.

Among the objects of the present invention are therefore the production of a composition that will effectively prevent germination of the spores of fungous parasites without injury to the seed; and further such compositions of solubility sufficient to give concentrations of fungicide capable of killing such spores without injury to the germination capacity of the seed.

Other and further objects and advantages will appear from the more detailed description set forth below, it being understood however that various changes may be made therein by those skilled in the art, without departing from the scope and spirit of this invention.

Primarily this invention resides in the utilization of the copper salt of the complex mecury thiocyanic acid of the formula $Cu(Hg(SCN)_4)$. This substance is of particular value for this purpose because the mercury is not present to any great extent in ionic form, but is part of a complex ion, and consequently is less injurious than simple mercury salts heretofore used for similar purposes. Further the solubility of this copper compound although low, is sufficient to yield a concentration of fungicide capable of killing fungus spores without injuring the germination capacity of the seed.

In applying this substance to the seed, it may be used in the pure state, or it may be mixed with an inert filler such as talc, or etc., or it may be mixed with another fungicidal substance, or both the inert filler and additional fungicidal substance may be used, as an addition to the copper salt. The material in whatever form it may be used, may be applied in any desired way to the seed, but the well known dusting process lends itself well to this end.

The following example illustrates one method of carrying out this invention, but should not be taken as limiting. 100 grams of the copper salt of the complex acid $H_2(Hg(SCN)_4)$ was mixed with 100 grams of powdered talc and this mixture applied to the seed to be treated by the well known dusting process. In one case, infected oat seed was dusted with the copper salt-talc mixture referred to above in the proportion of three ounces of fungicide to a bushel of seed. While the untreated seed gave plants with 10% of smutted heads, the treated seed gave plants entirely free from oat smut (*Ustilago avenæ*), (*Ustilago levis*).

While the copper salt of the complex mercury thiocyanic acid has been particularly emphasized for use in treating infected oat seed against certain fungi, the use of this material is not limited to that specific instance but has fairly wide application. Further, while the copper salt of this particular complex acid has been described, other metal salts such as sodium, calcium, and barium, and particularly the heavy metal salts such as copper, zinc, nickel, and cadmium may be used.

As pointed out above, these fungicidal substances need not be used alone, but may be mixed with other additional fungicides such as copper carbonate, mercuric chloride, phenol, etc., and with or without fillers such as talc referred to above, or Bentonite, kieselguhr, gypsum, and the like.

And while, as pointed out above, the complex copper salt referred to, or other metal salts named above, may be prepared and mixed with an inert filler and applied to the seed, it is not necessary to form the complex salt first before application to the seed, since the substances capable of reacting to give the copper salt may be mixed, with or without an inert filler, or other fungicide, or both, and this mixture applied to the seed. Subsequent use imposes conditions under which the desired complex salt is formed in situ. For example, a soluble copper salt, a soluble mercury salt, and a soluble thiocyanate may be mixed in the proportions necessary to form the slightly soluble copper salt of the complex mercury thiocyanic acid, with or without the use of a filler, etc., and this mixture applied to the seed. Among the soluble salts that may be used by way of example for this purpose there may be mentioned, copper sulphate, mercuric chloride, and sodium thiocyanate.

Having thus set forth my invention, I claim:

1. A fungicide for the treatment of seed to protect them against fungous parasites containing a copper salt of a complex mercury thiocyanic acid.

2. A fungicide for the treatment of seed to protect them against fungous parasites containing a copper salt of a complex mercury thiocyanic acid and talc.

3. A fungicidal dusting composition containing a complex copper salt of mercury thiocyanic acid having the formula $Cu(Hg(SCN)_4)$.

4. A process of treating infected oat seed which comprises dusting such seed with a fungicide containing the copper salt of a complex mercury thiocyanic acid.

5. A process of treating seed to protect the latter from spores of fungous parasites which comprises treating such seed with a composition containing the copper salt of a complex mercury thiocyanic acid and an inert filler.

FRANK WILCOXON.